United States Patent
Ozaki et al.

(10) Patent No.: US 11,300,850 B2
(45) Date of Patent: Apr. 12, 2022

(54) MACH-ZEHNDER MODULATOR

(71) Applicant: Nippon Telegraph and Telephone Corporation, Tokyo (JP)

(72) Inventors: Josuke Ozaki, Tokyo (JP); Shigeru Kanazawa, Tokyo (JP); Hiromasa Tanobe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 7 days.

(21) Appl. No.: 17/047,984

(22) PCT Filed: Apr. 11, 2019

(86) PCT No.: PCT/JP2019/015750
§ 371 (c)(1),
(2) Date: Oct. 15, 2020

(87) PCT Pub. No.: WO2019/203109
PCT Pub. Date: Oct. 24, 2019

(65) Prior Publication Data
US 2021/0157209 A1    May 27, 2021

(30) Foreign Application Priority Data
Apr. 19, 2018 (JP) .............................. JP2018-080428

(51) Int. Cl.
*G02F 1/21* (2006.01)
*G02F 1/225* (2006.01)

(52) U.S. Cl.
CPC .............. *G02F 1/212* (2021.01); *G02F 1/225* (2013.01)

(58) Field of Classification Search
CPC ...... G02F 1/212; G02F 1/225; G02F 2201/12; G02F 1/218
See application file for complete search history.

(56) References Cited

U.S. PATENT DOCUMENTS

| | | | |
|---|---|---|---|
| 7,751,656 B2 * | 7/2010 | Sugiyama | G02F 1/2255 385/2 |
| 8,917,958 B2 * | 12/2014 | Prosyk | G02F 1/035 385/3 |
| 9,664,931 B1 * | 5/2017 | Yap | G02F 1/225 |

(Continued)

FOREIGN PATENT DOCUMENTS

| | | |
|---|---|---|
| JP | S6418121 A | 1/1989 |
| JP | 2011186170 A | 9/2011 |

(Continued)

OTHER PUBLICATIONS

Griffin et al., "InP-Based High-Speed Transponder," OFC, Mar. 9, 2014, 3 pages.

(Continued)

*Primary Examiner* — John Bedtelyon
(74) *Attorney, Agent, or Firm* — Slater Matsil, LLP

(57) ABSTRACT

A second substrate is formed on a first substrate. The second substrate includes a Mach-Zehnder modulation unit and a coplanar line. Further, the second substrate is formed on and bonded to the first substrate via an adhesive layer made of a non-conductive adhesive. The Mach-Zehnder modulation unit has an optical modulation region by an electro-optic effect. The coplanar line transmits a modulated signal to the optical modulation region.

14 Claims, 3 Drawing Sheets

(56) References Cited

U.S. PATENT DOCUMENTS 9,817,294 B2 * 11/2017 Goi .................. G02F 1/2255
2009/0290830 A1 11/2009 Mitomi et al.

FOREIGN PATENT DOCUMENTS

| JP | 2017111238 A | 6/2017 |
| --- | --- | --- |
| WO | 2008108154 A | 9/2008 |

OTHER PUBLICATIONS

Klein, et al., "1.55 μm Mach-Zehnder Modulators on InP foroptical 40/80 Gbit/s transmission networks," International Conference onIndium Phosphide and Related Materials Conference Proceedings, May 8, 2006, pp. 171-173.

L. Morl et al., "A travelling wave electrode Mach-Zehnder 40 Gb/sdemultiplexer based on strain compensatedGaInAs/AlInAs tunnelling barrier MQW structure," International Conference on Indium Phosphide and Related Materials Conference Proceedings, May 11, 1998, pp. 403-406.

Wolf, et al., "Electro-Optical Co-Design to Minimize PowerConsumption of a 32 GBd Optical IQ-TransmitterUsing InP MZ-Modulators," 7th IEEE Compoundsemiconductor IC (CSIC) Symposium, Oct. 11, 2015, 4 pages.

\* cited by examiner

MACH-ZEHNDER MODULATOR

CROSS-REFERENCE TO RELATED APPLICATIONS

This application is a national phase entry of PCT Application No. PCT/JP2019/015750, filed on Apr. 11, 2019, which claims priority to Japanese Application No. 2018-080428, filed on Apr. 19, 2018, which applications are hereby incorporated herein by reference.

TECHNICAL FIELD

The present invention relates to a Mach-Zehnder modulator using optical modulation by an electro-optic effect.

BACKGROUND

Recent years have seen an explosive increase in data traffic, which requires a large-capacity optical communication system, leading to the need for an increase in integration and complexity of the optical components used in the system, and an increase in signal speed thereof. Examples of the optical components may include an optical modulator. In order to increase transmission capacity, recent years have seen the use of an optical I/Q modulator (see Non-Patent Literature 1) using a Mach-Zehnder (MZ) modulator corresponding to multi-level modulation such as QPSK and 16QAM.

In general, as illustrated in FIGS. 5 and 6, in this optical I/Q modulator, first, a high-frequency electrical signal is generated in a driver IC provided in each MZ modulator in a chip for driving the modulator. This high-frequency electrical signal is input to an optical modulation high-frequency line (phase modulation portion) formed in an optical modulation region via an input high-frequency line, and then modulates an optical signal by the electro-optic effect. Then, the high-frequency electrical signal, which modulates the optical signal, passes through an output high-frequency line and terminates with a terminating resistor. FIGS. 5 and 6 illustrate conventional semiconductor Mach-Zehnder modulators disclosed in Non-Patent Literature 1 and Non-Patent Literature 2 respectively.

For example, in order to generate an optically modulated signal of 100 Gbit/s or more, a high-speed electrical signal having a symbol rate of several tens of Gbaud is input to each MZ modulator in the chip. In order to handle such a very high frequency signal, the optical modulator is required to have a wide electro-optic (EO) band and no ripple in high frequency characteristics to generate a high-quality optical signal.

Recent years have seen a problem associated with reduction in size and drive voltage of an optical transmitter module, and accordingly vigorous efforts have been made in research and development of a semiconductor MZ modulator that can be small in size and low in drive voltage.

In general, a semiconductor substrate made of a semi-insulating semiconductor such as semi-insulating Indium Phosphide (SI-InP) is used to implement a broadband semiconductor MZ modulator. When a conductive substrate is used, the electric field leaks to the substrate side, and a capacitance is sensed between the substrate and the signal line. Therefore, this configuration prevents effective design of a capacitance-loaded electrode structure characterized by added capacitance in the phase modulation portion as illustrated in FIGS. 5 and 6 and prevents a low-loss electrode design considering impedance matching and speed matching, thus leading to significant deterioration in characteristics. For this reason, a semi-insulating substrate is used for a wideband modulator (Non-Patent Literature 3).

CITATION LIST

Non-Patent Literature

Non-Patent Literature 1: L. Morl et al., "A travelling wave electrode Mach-Zehnder 40 Gb/s demultiplexer based on strain compensated GaInAs/AlInAs tunneling barrier MQW structure", International Conference on Indium Phosphide and Related Materials, pp. 403-406, 1998.

Non-Patent Literature 2: H. N. Klein et al., "1.55 μm Mach-Zehnder Modulators on InP for optical 40/80 Gbit/s transmission networks", OFC, pp. 171-173, 2006.

Non-Patent Literature 3: R. A. Griffin, "InP-Based High-Speed Transponder", OFC, W3B.7, 2014.

Non-Patent Literature 4: N. Wolf et al, "Electro-Optical Co-Design to Minimize Power Consumption of a 32 GBd Optical IQ-Transmitter Using InP MZ-Modulators", 7th IEEE COMPOUND SEMICONDUCTOR IC (CSIC) SYMPOSIUM, 2015.

SUMMARY

Technical Problem

As described above, there has also been much attention to considering the electric field between the upper surface of the substrate and the signal line. Meanwhile, for modularization, the modulator chip is required to be mounted on metal such as being housed in a metal container, resulting in that there is a ground on a bottom side of the substrate, but the effect of the ground has not been mentioned. However, a thinner semi-insulating substrate causes the electric field to leak from the signal line and thereby to induce substrate resonance, thus leading to ripples occurring in the high frequency characteristics. Depending on the substrate thickness, ripples occur at high frequencies 40 GHz and above. For this reason, the above-mentioned ripples did not cause a problem at the conventional symbol rate such as 32 Gbaud, but cause a serious problem with an ultra-wideband modulator such as 64 GBaud or 100 GBaud, which has been actively studied in recent years.

Embodiments of the present invention have been made to solve the above problems, and an object of embodiments of the present invention is to enable suppression of the deterioration of high-frequency characteristics of a semiconductor Mach-Zehnder modulator using a substrate made of a semi-insulating semiconductor.

Means for Solving the Problem

A Mach-Zehnder modulator according to embodiments of the present invention includes: a first substrate made of a dielectric; a second substrate made of a semi-insulating semiconductor, formed on and bonded to the first substrate via an adhesive layer made of a non-conductive adhesive; a Mach-Zehnder modulation unit formed on the second substrate and having an optical modulation region by an electro-optic effect; and a coplanar line for transmitting a modulated signal to the optical modulation region formed on the second substrate, wherein the second substrate has a thickness of ¼ or more of a guide wavelength of the coplanar line.

In the Mach-Zehnder modulator, the second substrate has an electrical resistivity of $1\times10^7$ (Ωcm) or more and the second substrate has a thickness of 300 μm or less.

In the Mach-Zehnder modulator, the first substrate has a thermal expansion coefficient of 4.0 to $5.0\times10^{-6}$ [/K] and the first substrate has a thermal conductivity of 100 [W/(mK)] or more.

In the Mach-Zehnder modulator, the adhesive layer has a value of $2.0\times10^4$ [W/(m$^2$×K)] or more, the value being obtained by dividing the thermal conductivity by the thickness.

In the Mach-Zehnder modulator, on a waveguide end face side of the Mach-Zehnder modulation unit, a side surface of the first substrate may be disposed inside the second substrate by the thickness of the adhesive layer and on other than the waveguide end face side, the side surface of the first substrate may be the same as the side surface of the second substrate or may be disposed inside the second substrate.

In the Mach-Zehnder modulator, the first substrate is disposed on a member made of metal.

Effects of Embodiments of the Invention

As described above, embodiments of the present invention bond the first substrate made of a dielectric to a rear surface side of the second substrate via the adhesive layer made of a non-conductive adhesive, and thus demonstrates an excellent effect of enabling suppression of the deterioration of high-frequency characteristics of the semiconductor Mach-Zehnder modulator using the second substrate made of a semi-insulating semiconductor.

DETAILED DESCRIPTION OF ILLUSTRATIVE EMBODIMENTS

Figure 1A:
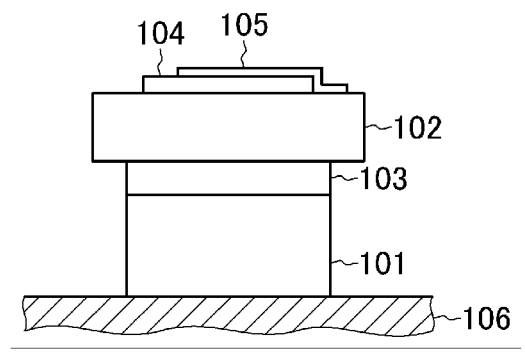
FIG. 1A is a sectional view illustrating a configuration of a Mach-Zehnder modulator according to an embodiment of the present invention.
Figure 1B:
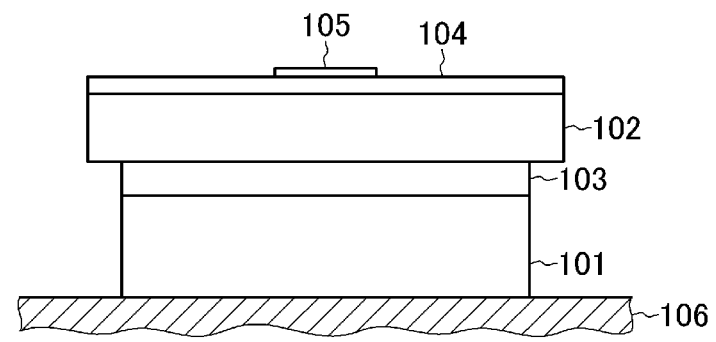
FIG. 1B is a sectional view illustrating the configuration of the Mach-Zehnder modulator according to the embodiment of the present invention.
Figure 2A:
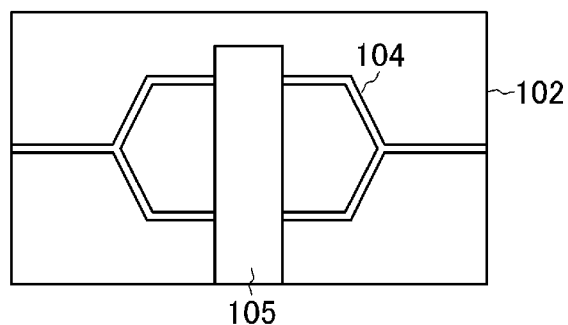
FIG. 2A is a plan view illustrating the configuration of the Mach-Zehnder modulator according to the embodiment of the present invention.
Figure 2B:
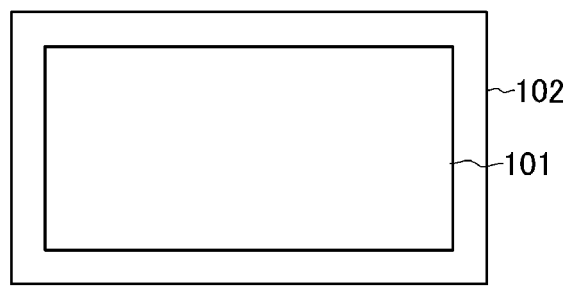
FIG. 2B is a plan view illustrating the configuration of the Mach-Zehnder modulator according to the embodiment of the present invention.

Hereinafter, with reference to FIGS. 1A, 1B, 2A, 2B, and 2C, a Mach-Zehnder modulator according to an embodiment of the present invention will be described. FIGS. 1A and 1B illustrate cross sections in directions different from each other by 90°. Further, FIG. 2A illustrates a front side of the Mach-Zehnder modulator, and FIG. 2B illustrates a rear side of the Mach-Zehnder modulator. The Mach-Zehnder modulator includes a first substrate 101 and a second substrate 102 mounted thereon. The second substrate 102 includes a Mach-Zehnder modulation unit 104 and a coplanar line 105.

Further, the second substrate 102 is mounted on and bonded to the first substrate 101 via an adhesive layer 103 made of a non-conductive adhesive. Note that in the embodiment, the Mach-Zehnder modulator is housed in a package 106 made of a metal. For example, the first substrate 101 is fixed to a bottom surface of the package 106 (on a member made of metal) via a temperature control device (unillustrated) whose surface is made of metal or a metal element (unillustrated). Note that as illustrated in FIGS. 1A and 1B, the first substrate 101 may be fixed directly to the bottom surface of the package 106.

The first substrate 101 is made of, for example, a dielectric such as aluminum nitride (AlN). The second substrate 102 is made of a semi-insulating semiconductor such as semi-insulating indium phosphide (InP). The Mach-Zehnder modulation unit 104 has an optical modulation region by the electro-optic effect. The coplanar line 105 transmits a modulated signal to the optical modulation region.

Further, in the embodiment, the second substrate 102 has a thickness of ¼ or more of the guide wavelength of the coplanar line 105.

For example, the second substrate 102 has an electrical resistivity of $1\times10^7$ (Ωcm) or more and the second substrate 102 has a thickness of 300 μm or less. Further, the first substrate 101 has a thermal expansion coefficient of 4.0 to $5.0\times10^{-6}$ [/K] and the first substrate 101 has a thermal conductivity of 100 [W/(mK)] or more. Furthermore, the adhesive layer 103 has a value of $2.0\times10^4$ [W/(m$^2$×K)] or more, the value being obtained by dividing the thermal conductivity by the thickness.

The semiconductor Mach-Zehnder modulator is generally manufactured using a circular wafer with a diameter of 2 to 4 inches. A commercially available semi-insulating InP substrate (wafer) generally includes one having a diameter of 2 inches and a thickness of 350 μm, one having a diameter of 3 inches and a thickness of 600 μm, and one having a diameter of 4 inches and a thickness of about 650 μm.

The semiconductor Mach-Zehnder modulator is completed such that after the wafer process is finished, a waveguide end face is exposed by cleavage and an antireflection (AR) coating is applied to the waveguide end face. It is important that the substrate thickness is made to be 300 μm or less in order to stably expose the waveguide end surface with good yield at cleavage. If the substrate thickness exceeds 300 μm, cleavage is enabled, but the amount of thrust at cleavage increases, the effect of which increases the risk of damage to the waveguide at cleavage and causes a deterioration in manufacturing yield.

However, all commercially available wafers with a diameter of 2 to 4 inches have a thickness of more than 300 μm. For this reason, a wafer for the semiconductor Mach-Zehnder modulator needs to be polished to have a thickness of 300 μm or less with high precision. Note that an uneven thickness of the substrate (second substrate 102) may cause a variation in mounting thereto of an optical system such as a lens or other members and may cause deterioration of characteristics. Therefore, the substrate thickness is desirably controlled with high precision. For example, the substrate thickness is desirably reduced to 250 μm±5 μm within a few percent error. This can be stably implemented with a common polishing device. Note also that in order to prevent the deterioration of high-frequency characteristics, the substrate needs to have sufficient insulating properties. Thus, it is important that the substrate has a resistivity of $1 \times 10^7$ ($\Omega$cm) or more.

Here, the thermal expansion coefficient of InP constituting the second substrate 102 is about $4.5 \times 10^{-6}$ (/K). Thus, considering the matching of the thermal expansion coefficients, it is important that the difference in the thermal expansion coefficient between the first substrate 101 and the second substrate 102 is controlled within about 10 percent. For example, the first substrate 101 desirably has a thermal expansion coefficient of 4.0 to $5.0 \times 10^{-6}$ (/K). If this value is not met, there is generated a difference in thermal expansion coefficient between the second substrate 102 and the first substrate 101, thus leading to a reduction in bonding strength due to thermal stress and causing a risk of damage to the substrate when mounted or the like.

Further, the Mach-Zehnder modulator assumes temperature control operation. Furthermore, integrated driver ICs, low power consumption, and wide bandwidth have been actively studied (Non-Patent Literature 4). Considering the heat inflow from a driver IC, the first substrate 101 desirably has a thermal conductivity of 100 [W/(mK)] or more. Considering the heat management in this manner, attention needs to be paid not only to the first substrate 101 but also to the thickness and the thermal conductivity of the adhesive layer 103. The adhesive layer 103 desirably has a value of $1.4 \times 10^4$ [W/(m$^2 \times$K)] (thermal conductivity/thickness of the adhesive layer 103) or more. This means that, for example, if the thermal conductivity is 0.7 W/(m$\times$K), the thickness of the adhesive layer 103 needs to be 35 μm or less. Furthermore, if the thermal conductivity is greater than 0.7 W/(m$\times$K), the thickness of the adhesive layer 103 may be 35 μm or more.

Here, as illustrated in FIG. 2B, the area of the first substrate 101 needs to be smaller than that of the second substrate 102 by the thickness of the adhesive layer 103. More specifically, on the waveguide end face side of the Mach-Zehnder modulation unit 104, the side surface of the first substrate 101 is disposed inside the second substrate 102 by the thickness of the adhesive layer 103. On other than the waveguide end face side, the side surface of the first substrate 101 may be the same as the side surface of the second substrate 102 or may be disposed inside the second substrate 102.

If the area of the first substrate 101 is larger than the area of the second substrate 102, there is a risk that the adhesive layer 103 spreads out, causing the peripheral edge portion of the second substrate 102 to rise upward and contact the waveguide end face. In order to avoid this risk, the area of the first substrate 101 is made to be smaller than the area of the second substrate 102. Further, a smaller area of the first substrate 101 allows the required components such as a terminating resistor and a capacitor of the Mach-Zehnder modulator to be disposed as close as possible to the vicinity of the Mach-Zehnder modulator, thereby enabling reduction in the overall size. Further, there is also an advantage capable of shortening the wire used for connection between the components.

Figure 2C:
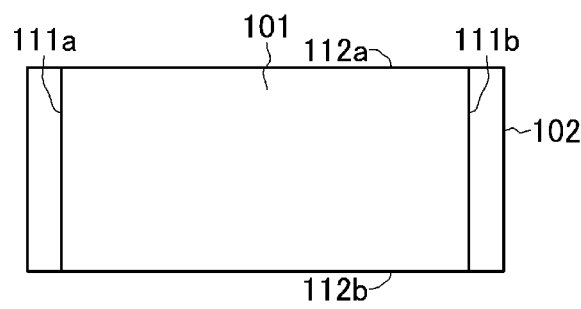
FIG. 2C is a plan view illustrating the configuration of the Mach-Zehnder modulator according to the embodiment of the present invention.
Figure 3:
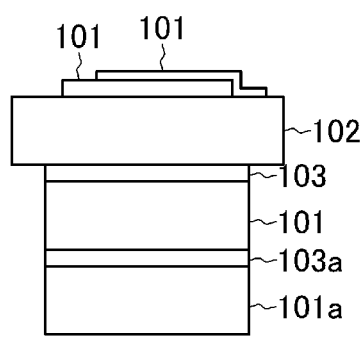
FIG. 3 is a sectional view illustrating a configuration of another Mach-Zehnder modulator according to an embodiment of the present invention.

Note that as illustrated in FIG. 2C, only the sides 111a and 111b where the waveguide end faces are disposed need to be offset and the other sides 112a and 112b do not need to be offset. Note also that as illustrated in FIG. 3, another configuration may be adopted such that a first substrate 101a made of a dielectric material such as AlN is attached to further below the first substrate 101 via an adhesive layer 103a made of a non-conductive adhesive. A plurality of first substrates may be used in this manner to set the thickness of the entire first substrate.

Next, the results of calculating the high-frequency characteristics of the Mach-Zehnder modulator according to the embodiment will be described with reference to FIG. 4. As described using FIG. 5, the semiconductor Mach-Zehnder modulator (capacitance-loaded electrode structure) consists of three portions: an input lead line portion, a phase modulation portion, and an output lead line portion. Here, as an example, a high-frequency simulation for simulating the simplest input lead line portion was performed. In light of the trend for driver integration as a structure, the high-frequency simulation was performed using a structure in which a simple coplanar line based on a ground-signal-signal-ground (GSSG) differential line is formed on the second substrate (having a thickness of 250 μm) made of semi-insulating InP and the second substrate is mounted on the first substrate made of aluminum nitride (AlN).

Figure 4:
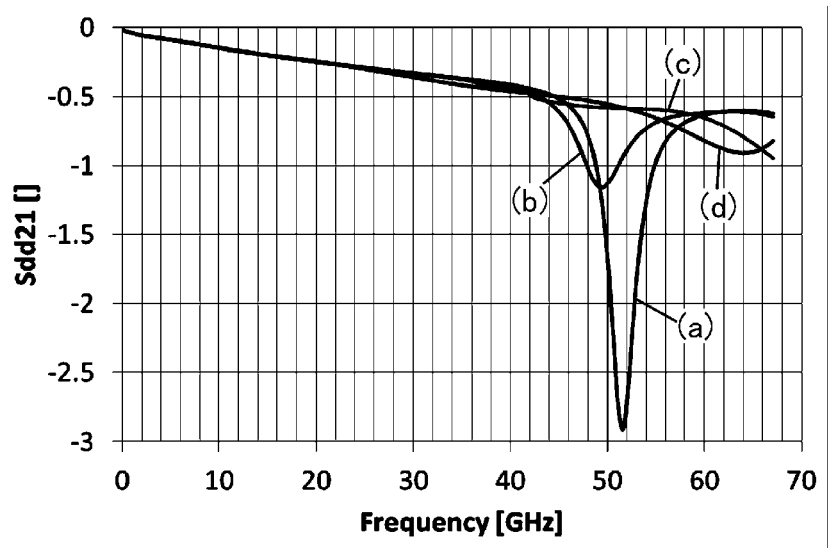
FIG. 4 is a characteristic diagram illustrating a result of calculating high-frequency characteristics of the Mach-Zehnder modulator according to the embodiment.
Figure 5:
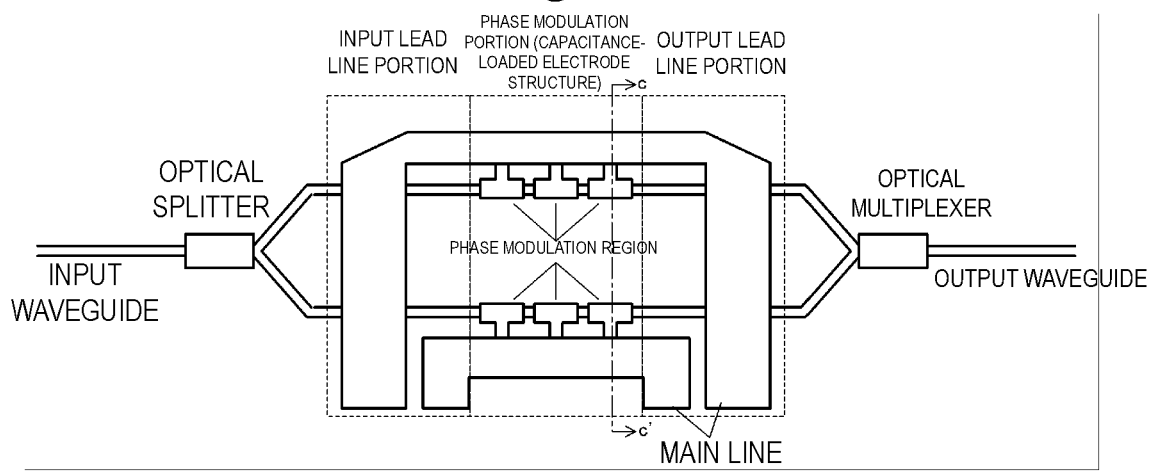
FIG. 5 is a plan view illustrating a configuration of a semiconductor Mach-Zehnder modulator disclosed in Non-Patent Literatures 1 and 2.
Figure 6:
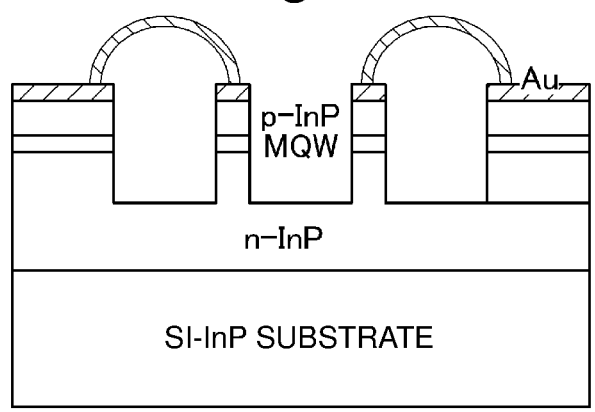
FIG. 6 is a sectional view illustrating the configuration of the semiconductor Mach-Zehnder modulator disclosed in Non-Patent Literatures 1 and 2.

FIG. 4 illustrates a simulation result of transmission characteristics of a differential signal when the thickness of the first substrate is changed. In the present simulation, the present calculation model did not include the adhesive layer whose thickness was sufficiently thinner than the substrate thickness. FIG. 4 illustrates a case (a) in which the second substrate has a thickness of 250 μm and the first substrate has a thickness of 0 μm (no the first substrate); a case (b) in which the second substrate has a thickness of 250 μm and the first substrate has a thickness of 250 μm; a case (c) in which the second substrate has a thickness of 250 μm and the first substrate has a thickness of 500 μm; and a case (d) in which the second substrate has a thickness of 250 μm and the first substrate has a thickness of 750 μm.

As illustrated by (a) and (b) in FIG. 4, it can be confirmed that in cases in which the thickness of the first substrate was less than 500 μm, a ripple occurred. In order to suppress this ripple, the thickness of the first substrate is desirably 500 μm or more. The present calculation shows that the thickness of the second substrate made of semi-insulating InP is 250 μm, and thus the thickness of the second substrate+the thickness of the first substrate needs to be 750 m or more.

In other words, it can be confirmed that the required thickness is equal to or greater than ¼ of the guide wavelength of the GSSG differential coplanar line formed on the second substrate, and by satisfying this condition, resonance can be sufficiently suppressed. Note that since the frequency of this ripple exceeds 40 GHz, in a case in which the modulation bandwidth of the modulator is less than 40 GHz, the effect of eliminating this ripple cannot be obtained. In other words, the effects of embodiments of the present invention can be obtained in cases in which the modulation bandwidth of the modulator is equal to or greater than 40 GHz, and thus embodiments of the present invention are useful for a modulator for ultra-high-speed modulation operation such as 64 GBd and 100 GBd. Therefore, currently popular modulators for 32 GBd are not the main target of embodiments of the present invention.

Note that the ripple frequency is caused by substrate resonance, and thus the frequency changes if the thickness of the substrate is different. For example, when the substrate becomes thinner, the ripple position on the high-frequency side shifts. Further, it is understood from this result that this is due to substrate resonance induced by sensing metal (ground) under the substrate, and thus the adhesive layer for fixing the second substrate and the first substrate needs to be made of a non-conductive adhesive. If the adhesive layer is made of a conductive adhesive, the conductive material is placed directly under the second substrate, and the ripple position on the high-frequency side is drawn to the conductive material. Thus, no matter how thick the first substrate is, the substrate resonance cannot be suppressed.

The present simulation was performed on the GSSG differential coplanar line as a typical example. This is because the driver integration can achieve a wider band and lower power consumption as described above. In light of efficient connection with the driver and compatibility with the capacitor-loaded electrode structure of the modulator, the GSSG differential coplanar line structure is optimal. However, if the electrode structure is composed of a coplanar line, similar characteristics can also be obtained by a single-ended structure composed of a conventional GS line. Further, similar effects can be obtained not only by the GSSG line but also by a differential coplanar line such as a GSGSG line and an SS line.

Further, the Mach-Zehnder modulator according to the embodiment is mounted on the package of the optical module, but has a thickness sufficient to suppress resonance, thus there is no problem if the Mach-Zehnder modulator is mounted on another first substrate or a metal block via an adhesive layer made of a conductive adhesive.

The Mach-Zehnder modulator according to the embodiment is configured such that for example, a lower cladding layer made of InP, a core layer made of a non-doped semiconductor, and an upper cladding layer made of InP are sequentially stacked on the second substrate made of SI-InP to form an optical waveguide which constitutes a Mach-Zehnder interferometer. The core layer is made of, for example, a material system such as InGaAsP and InGaAlAs, and can be constituted by a single composition quaternary mixed crystal bulk layer or a multiple quantum well layer. Further, the core layer may be configured to include a multiple quantum well layer and a light confinement layer, which is provided above and below the multiple quantum well layer, whose band gap has a value larger than that of the multiple quantum well layer and smaller than those of the upper and lower cladding layers.

The band gap wavelength of the quaternary mixed crystal bulk layer and the multiple quantum well layer is set so that the electro-optic effect works effectively and light absorption does not matter at the optical wavelength used. One of the upper cladding layer and the lower cladding layer may be an n-type semiconductor, and the other may be a p-type semiconductor.

Meanwhile, both the upper cladding layer and the lower cladding layer may be an n-type semiconductor, and a third p-type cladding layer may be inserted between the upper cladding layer and the core layer or between the lower cladding layer and the core layer.

Further, the material forming the second substrate and the optical waveguide is not limited to the InP-based material, but, for example, a GaAs-based material may be used.

As described above, embodiments of the present invention bond the first substrate made of a dielectric to a rear surface side of the second substrate via the adhesive layer made of a non-conductive adhesive, and thus can suppress deterioration of high-frequency characteristics of the semiconductor Mach-Zehnder modulator using the second substrate made of a semi-insulating semiconductor.

Note that it is clear that the present invention is not limited to the embodiments described above, and many modifications and combinations can be made by those skilled in the art within the technical idea of the present invention.

REFERENCE SIGNS LIST 101 first substrate
102 second substrate
103 adhesive layer
104 Mach-Zehnder modulation unit
105 coplanar line
106 package.

The invention claimed is:

1. A device comprising:
a first substrate made of a dielectric;
a second substrate made of a semi-insulating semiconductor, bonded to the first substrate via an adhesive layer, the adhesive layer is made of a non-conductive adhesive;
a Mach-Zehnder modulator on the second substrate and having an optical modulation region by an electro-optic effect; and
a coplanar line for transmitting a modulated signal to the optical modulation region, wherein the coplanar line is disposed on the second substrate, and wherein the second substrate has a thickness of a quarter or more of a guide wavelength of the coplanar line.

2. The device according to claim 1, wherein
the second substrate has an electrical resistivity of $1 \times 10^7$ ($\Omega$cm) or more; and
the second substrate has a thickness of 300 μm or less.

3. The device according to claim 1, wherein:
the first substrate has a thermal expansion coefficient of $4.0 \times 10^{-6}$/K to $5.0 \times 10^{-6}$/K; and
the first substrate has a thermal conductivity of 100 W/mK or more.

4. The device according to claim 1, wherein
the adhesive layer has a value of $2.0 \times 10^4$ W/m$^2$×K or more, the value being obtained by dividing a thermal conductivity of the adhesive layer by a thickness of the adhesive layer.

5. The device according to claim 1, wherein:
on a waveguide end face side of the Mach-Zehnder modulator, a side surface of the first substrate is disposed inside the second substrate by the thickness of the adhesive layer in a top down view; and
on another side of the Mach-Zehnder modulator than the waveguide end face side, the side surface of the first substrate overlaps a side surface of the second substrate in a top down view.

6. The device according to claim 1, wherein:
on a waveguide end face side of the Mach-Zehnder modulator, a side surface of the first substrate is disposed inside a boundary of the second substrate by the thickness of the adhesive layer in a top down view; and
on another side of the Mach-Zehnder modulator than the waveguide end face side, the side surface of the first substrate is disposed inside the boundary of the second substrate in a top down view.

7. The device according to claim 1, wherein the first substrate is disposed on a metallic member.

8. A method comprising:
providing a first substrate made of a dielectric;
bonding a second substrate made of a semi-insulating semiconductor to the first substrate via an adhesive layer, the adhesive layer is made of a non-conductive adhesive;

disposing a Mach-Zehnder modulator on the second substrate, the Mach-Zehnder modulator having an optical modulation region by an electro-optic effect; and disposing a coplanar line for transmitting a modulated signal to the optical modulation region on the second substrate, wherein the second substrate has a thickness of a quarter or more of a guide wavelength of the coplanar line.

9. The method according to claim 8, wherein
the second substrate has an electrical resistivity of $1 \times 10^7$ ($\Omega$cm) or more; and
the second substrate has a thickness of 300 μm or less.

10. The method according to claim 8, wherein:
the first substrate has a thermal expansion coefficient of $4.0 \times 10^{-6}$/K to $5.0 \times 10^{-6}$/K; and
the first substrate has a thermal conductivity of 100 W/mK or more.

11. The method according to claim 8, wherein the adhesive layer has a value of $2.0 \times 10^4$ W/m²×K or more, the value being obtained by dividing a thermal conductivity of the adhesive layer by a thickness of the adhesive layer.

12. The method according to claim 8, wherein:
on a waveguide end face side of the Mach-Zehnder modulator, a side surface of the first substrate is disposed inside the second substrate by the thickness of the adhesive layer in a top down view; and
on another side of the Mach-Zehnder modulator than the waveguide end face side, the side surface of the first substrate overlaps a side surface of the second substrate in a top down view.

13. The method according to claim 8, wherein:
on a waveguide end face side of the Mach-Zehnder modulator, a side surface of the first substrate is disposed inside a boundary of the second substrate by the thickness of the adhesive layer in a top down view; and
on another side of the Mach-Zehnder modulator than the waveguide end face side, the side surface of the first substrate is disposed inside the boundary of the second substrate in a top down view.

14. The method according to claim 8, wherein the first substrate is disposed on a metallic member.

* * * * *